United States Patent [19]

Sawhill

[11] 3,835,135

[45] Sept. 10, 1974

[54] POLYCHLOROISOCYANURIC ACIDS PREPARED FROM A MONOALKALI METAL CYANURATE

[75] Inventor: Duane L. Sawhill, Orange, Conn.

[73] Assignee: Olin Corporation, New Haven, Conn.

[22] Filed: Apr. 20, 1973

[21] Appl. No.: 353,098

[52] U.S. Cl. .......................................... 260/248 C
[51] Int. Cl. .............................................. C07d 55/42
[58] Field of Search ................................ 260/248 C

[56] References Cited
UNITED STATES PATENTS 3,397,206  8/1968  Nicolaisen ........................... 260/248

*Primary Examiner*—John M. Ford
*Attorney, Agent, or Firm*—Donald F. Clements; Thomas P. O'Day

[57] ABSTRACT

Polychloroisocyanuric acids are produced by the reaction of monoalkali metal cyanurate with an alkali metal hypochlorite and a chlorine-containing compound selected from the group consisting of chlorine and chlorine octahydrate, where the molar ratio of chlorine-containing compound to the alkali metal hypochlorite and monoalkali metal cyanurate combined is at least 1:1. Where an excess of chlorine-containing compound is used, this excess is employed to remove any gaseous by-products such as nitrogen trichloride, which may be formed during the reaction. This excess containing gaseous by-products is reacted with an alkali metal compound to convert the chlorine present to an alkali metal hypochlorite, which is used in the chlorination reaction. Reaction conditions include a temperature range of from −5° to 45°C. and a pH of 3 to 4.5.

20 Claims, No Drawings

POLYCHLOROISOCYANURIC ACIDS PREPARED FROM A MONOALKALI METAL CYANURATE

This invention relates to a process for the production of polychloroisocyanuric acids by the chlorination of monoalkali metal cyanurates. Polychloroisocyanurates are well-known products used in washing, bleaching and sanitizing applications.

It is known to react di- or trisodium cyanurate with a chlorinating agent such as chlorine to produce di- or trichloroisocyanuric acid. See, for example, U.S. Pat. Nos. 2,956,056 issued to Christian, and 2,964,525 issued to Robinson.

Di- or trisodium cyanurate are prepared by the reaction of at least two or three moles of caustic soda respectively with one mole of cyanuric acid. The resulting cyanurate is then reacted with $Cl_2$. In a one-step process, these highly exothermic reactions produce a large amount of heat. The nature of the slurry makes heat removal difficult and often operational difficulties result through the plugging of heat exchangers required for heat removal.

Also known is the use of a mixture of chlorine and sodium hypochlorite to chlorinate cyanuric acid to produce di- or trichloroisocyanuric acid as disclosed in U.S. Pat. No. 3,668,204, issued to Mesiah.

Such a process requires a low operating temperature with subsequently extensive requirements for cooling equipment and thus considerable expense.

An object of the present invention is a process for producing polychloroisocyanuric acids having low cooling requirements and thus reduced costs.

Another object of the process of the present invention is the removal of the explosively dangerous gaseous by-product nitrogen trichloride formed and its decomposition to recover valuable raw materials.

These and other objects of the invention will be apparent from the following detailed description of the invention.

Briefly, the process of the present invention for producing polychloroisocyanuric acids comprises reacting an aqueous slurry of a monoalkali metal cyanurate with an alkali metal hydrochlorite and a chlorine-containing compound selected from the group consisting of chlorine and chlorine octahydrate, wherein the molar ratio of the chlorine-containing compound to the alkali metal hypochlorite and monoalkali metal cyanurate combined is at least 1:1.

More in detail, an aqueous slurry of any monoalkali metal cyanurate, for example, sodium, potassium or lithium can be reacted in accordance with the process of this invention. A preferred embodiment is the use of monosodium cyanurate. The aqueous slurry can contain any convenient amount of monoalkali metal cyanurate. For example, the slurry should be at such a concentration that it can be pumped or conveyed under the reaction conditions employed and yet not be so dilute that an excessive amount of water must be handled. A slurry containing from about 8 to about 35 percent, preferably from about 10 to about 30 percent of solids in suitable.

Suitable alkali metal hypochlorites include, for example, sodium, potassium and lithium hypochlorites, with sodium hypochlorite being preferred. Aqueous solutions containing from about 5 to about 35, and preferably from about 10 to about 20 percent by weight of alkali metal hypochlorite can be employed.

The amount of chlorine-containing compound fed to the reaction slurry is at least a stoichiometric amount equal to the combined amounts of monoalkali metal cyanurate and alkali metal hypochlorite. As illustrated in Equations (1) and (2) below, the molar ratio of chlorine-containing compound to the monoalkali metal cyanurate and alkali metal hypochlorite combined is at least 1:1 for preparing either dichloroisocyanuric acid or trichloroisocyanuric acid. Preferably, the proportion of chlorine-containing compound employed is in excess of the stoichiometric amount, for example, a molar ratio to the combined monoalkali metal cyanurate and alkali metal hypochlorite in the range from about 1.01:1 to about 5:1, preferably from about 1.2:1 to about 4:1.

When a chlorine-containing compound is fed to the reaction slurry in the proportion described above, sufficient alkali metal hypochlorite is fed to the reaction slurry to provide at least a stoichiometric proportion of alkali metal hypochlorite to form dichloroisocyanuric acid and trichloroisocyanuric acid in accordance with Equations (1) and (2) below. For example, when the desired product is dichloroisocyanuric acid and the chlorine-containing compound is fed to the reaction slurry in the proportion described above, the molar ratio of alkali metal hypochlorite to monoalkali metal cyanurate fed to the reaction slurry ranges from about 1:2 to about 1.1:2. Similarly, when the desired product is trichloroisocyanuric acid the molar ratio of alkali metal hypochlorite to monoalkali metal cyanurate fed to the reaction slurry ranges from about 1:1 to about 1.1:1. Thus, it can be seen that when these specific polychloroisocyanuric acids or mixtures thereof are desired as products, the molar ratio of alkali metal hypochlorite to monoalkali metal cyanurate ranges from about 1:2 to about 1.1:1 when the chlorine-containing compound is fed to the reaction slurry in the proportions described above. Greater proportions of alkali metal hypochlorite may be used if desired, but these excess proportions are generally uneconomical. The term "polychloroisocyanuric acid" as used throughout the description and claims includes dichloroisocyanuric acid, trichloroisocyanuric acid and mixtures thereof.

The molar ratio of chlorine-containing compound to alkali metal hypochlorite is from about 2:1 to about 6:1 and preferably from about 2.2:1 to about 3.2:1 for the preparation of trichloroisocyanuric acid. In preparing dichloroisocyanuric acid, a molar ratio of chlorine-containing compound to alkali metal hypochlorite of from about 3:1 to about 6:1 and preferably from about 3.3:1 to about 4.3:1 is used.

The molar ratio of alkali metal cyanurate to that of the combined moles of alkali metal hypochlorite and the chlorine-containing compound fed to the reactor determines the degree of chlorination and thus the polychloroisocyanuric acid product obtained. A molar ratio of alkali metal cyanurate to that of alkali metal hypochlorite and chlorine-containing compound combined of about 1:2 gives essentially dichloroisocyanuric acid. A molar ratio of 1:3 gives essentially trichloroisocyanuric acid, while molar ratios of between about 1:2 and about 1:3 give a product mixture of di- and trichloroisocyanuric acid.

The feed rates of monoalkali metal cyanurate, alkali metal hypochlorite and chlorine-containing compounds are adjusted to give the desired pH and reactor retention time. The pH is maintained at about 3 to about 4.5, and preferably at about 3 to about 4. The reactor retention time can vary, for example, from about 3 to about 45 minutes and preferably from about 5 to about 30 minutes.

The reaction temperature is maintained at from about −5° to about 45°C., preferably from about 15° to about 30°C.

A slurry of polychloroisocyanuric acid is produced containing from about 10 to about 20 percent by weight of solids. The polychloroisocyanuric acid product may be recovered from a mother liquor containing an alkali metal chloride in solution by any suitable method of separation such as filtering or centrifuging.

The reactions of the present process are illustrated by the following equations, in which monosodium cyanurate is used as the monoalkali metal cyanurate, chlorine as the chlorine-containing compound, and sodium hypochlorite as the alkali metal hypochlorite:

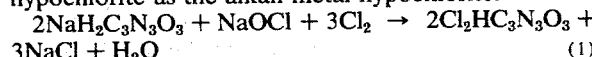

(1)

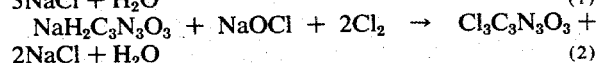

(2)

Gaseous by-products which can be formed during the reaction include compounds such as nitrogen trichloride, carbon dioxide and ammonia. The build-up of nitrogen trichloride should be avoided as it can be explosively dangerous, particularly at concentrations above about 1,000 parts per million.

In an additional embodiment, an excess of chlorine-containing compound is fed to the reactor to remove any gaseous by-products formed during the chlorination reaction. The excess can be any suitable amount above the 1:1 molar ratio required with respect to the monoalkali metal cyanurate and alkali metal hypochlorite combined, as shown in Equations (1) and (2) above. A suitable excess of chlorine-containing compound is present when the molar ratio of chlorine-containing compound to monoalkali metal cyanurate and alkali metal hypochlorite combined fed to the reaction slurry is from about 1.01.1 to about 5:1 and preferably from about 1.1:1 to about 4:1. The excess portion of chlorine-containing compound used for sweeping by-product gases from the reaction slurry, is equivalent to a molar ratio of chlorine-containing compound to monoalkali metal cyanurate and alkali metal hypochlorite combined of from about 0.01:1 to about 4:1 and preferably from about 0. :1 to about 3:1.

This excess of chlorine-containing compound containing gaseous by-products removed from the reaction slurry is conducted to a scrubbing unit containing an aqueous solution of an alkali metal compound selected from the group consisting of hydroxides and carbonates. Gaseous by-products such as nitrogen trichloride removed in the excess chlorine and decomposed in the scrubbing units to nitrogen and chlorine, and all chlorine present reacts with the alkali metal compound to form an aqueous solution of an alkali metal hypochlorite. This solution is then fed to the chlorination reaction. Those skilled in the art will readily recognize that an alkaline earth metal hydroxide or carbonate may be used in place of the alkali metal compound.

When chlorine octahydrate is used as the chlorine-containing compound, and an excess is desired, a reaction temperature of from about 10° to about 25°C is preferred, to assure the release of chlorine to remove gaseous by-products.

While the process of the present invention may be carried out batch-wise, it is preferred to conduct a continuous process which comprises:

a. reacting an aqueous slurry of a monoalkali metal cyanurate in a first reactor with an alkali metal hypochlorite and a chlorine-containing compound selected from the group consisting of chlorine and chlorine octahydrate to form a reaction slurry containing said polychloroisocyanuric acid, wherein the chlorine-containing compound fed to the reaction slurry is in excess of the stoichiometric amount required with respect to said monoalkali metal cyanurate and said alkali metal hypochlorite combined, the proportion of chlorine-containing compound being equivalent to a molar ratio of chlorine-containing compound to monoalkali metal cyanurate and alkali metal hypochlorite combined of at least 1.01:1, b. maintaining the temperature in the reaction slurry of from about 10° to about 25°C. and a pH of the reaction slurry from about 3 to about 4.5, c. using the excess of chlorine-containing compound to remove gaseous by-products formed during the reaction, d. reacting this excess containing gaseous by-products in a second reactor with an alkali metal compound selected from the group consisting of hydroxides and carbonates to produce a hypochlorite of the alkali metal and feeding the hypochlorite to the first reactor.

The polychloroisocyanuric acids produced by the process of the present invention are recovered as a precipitate from the reaction mixture.

Polychloroisocyanuric acid crystals produced by the process of the present invention are large and easily recovered for example, by filtration.

In addition, gaseous by-products such as the highly explosive nitrogen trichloride are effectively removed from the chlorination reaction and decomposed to recover the chlorine present.

The process can be conducted in the presence of varying amounts of alkali metal chloride without harmfully affecting the yield or recovery of the product.

The monoalkali metal cyanurate used as a reactant in this invention can be prepared in any suitable manner, for example, by the reaction of cyanuric acid with an aquimolar amount of an alkali metal hydroxide such as sodium hydroxide in an aqueous solution while maintaining the pH at about 9.

When chlorine is employed as the chlorine-containing compound, it can be used in the gas or liquid form.

Chlorine octahydrate can be prepared, for example, by the reaction of chlorine with water at a temperature of from about −5°C. to about 9°C. A suspension of chlorine octahydrate crystals is obtained containing about 10 to 30 percent by weight of chlorine.

The process of the present invention is further illustrated by the following examples. All percentages used are by weight unless otherwise specified.

EXAMPLE 1

Into a one-liter reactor was simultaneously added 12.85 parts per minute of NaOCl solution (148.5 parts available Cl/liter), 38.1 parts per min. of an 11.4 percent slurry of monosodium cyanurate monohydrate in water and 4.00 parts per min. of $Cl_2$ gas. A 10 percent excess of $Cl_2$ was used to assure complete reaction. The reactor was stirred with a mechanically driven Teflon impeller and was cooled by immersion in an ice bath. An overflow pipe was provided at the 500 ml. level on the reactor permitting the product to continuously spill out. The reaction was maintained at pH 3.0 to 3.5 and 20° to 30°C. The pH electrode was kept immersed in the overflow line. A yield of trichloroisocyanuric acid of greater than 87 percent (based on monosodium cyanurate · $H_2O$) was obtained, whose assay was 90.8 percent available chlorine (theoretical assay 91.6 percent).

EXAMPLE 2

The process of Example 1 was repeated using 5.46 parts of $Cl_2$ per min., of which 1.82 parts per min. was employed to sweep out any gaseous by-products such as nitrogen trichloride which may have been formed. The 1.82 parts per min. of $Cl_2$ was absorbed in a chilled scrubber. The absorbing medium in the scrubber was a 16.75 percent NaOH solution, fed at the rate of 12.90 parts per min.

The rate of addition of chlorine provided the equivalent of 3 moles of $Cl_2$ per mole of monosodium cyanurate. Of this amount, 1 mole was used to strip off any nitrogen trichloride formed and the mixture fed to a gas scrubber containing sodium hydroxide solution. Any $NCl_3$ present was decomposed to $N_2$ and $Cl_2$ and the chlorine present reacted with the NaOH to form a solution of sodium hypochlorite. This NaOCl solution was fed to the chlorinator. An 87.8 percent yield of trichloroisocyanuric acid was obtained whose assay was 90.5 percent available chlorine (theoretical assay 91.6 percent).

What is claimed is:

1. A process for preparing a polychloroisocyanuric acid which comprises reacting an aqueous slurry of a monoalkali metal cyanurate with an alkali metal hypochlorite and a chlorine-containing compound selected from the group consisting of chlorine and chlorine octahydrate to form a reaction slurry containing said polychloroisocyanuric acid, wherein the molar ratio of said chlorine-containing compound to said monoalkali metal cyanurate and said alkali metal hypochlorite combined in said reaction slurry is at least 1:1, and separating said polychloroisocyanuric acid from said reaction slurry.

2. The process of claim 1 wherein the temperature of said reaction slurry is maintained at from about −5° to about 45°C. and the pH of said reaction slurry is from about 3 to about 4.5.

3. The process of claim 1 wherein the proportion of said chlorine-containing compound fed to said reaction slurry is comprised of the stoichiometric amount required with respect to said monoalkali metal cyanurate and said alkali metal hypochlorite combined and an excess portion of said chlorine-containing compound sufficient to remove by-product gases formed in said reaction slurry, the total proportion of said chlorine-containing compound fed to said reaction slurry being equivalent to a molar ratio of said chlorine-containing compound to said alkali metal cyanurate and said alkali metal hypochlorite combined in the range from about 1.01:1 to about 5:1.

4. The process of claim 3 wherein said total proportion of said chlorine-containing compound is equivalent to a molar ratio of said chlorine-containing compound to said monoalkali metal cyanurate and said alkali metal hypochlorite combined in the range from about 1.1:1 to about 4:1.

5. The process of claim 4 wherein said monoalkali metal cyanurate is monosodium cyanurate and said temperature is from about 10° to about 25°C.

6. The process of claim 5 wherein said chlorine-containing compound is chlorine.

7. The process of claim 6 wherein said excess of chlorine-containing compound containing said gaseous by-products is reacted with an alkali metal compound selected from the group consisting of hydroxides and carbonates to form a hypochlorite of said alkali metal.

8. The process of claim 7 wherein said monoalkali metal cyanurate is sodium cyanurate and said alkali metal compound is sodium hydroxide.

9. The process of claim 8 wherein the molar ratio of said alkali metal hypochlorite to said monosodium cyanurate is in the range from about 1:2 to about 1.1:1.

10. The process of claim 9 wherein the molar ratio of said alkali metal hypochlorite to said monosodium cyanurate is in the range from about 1:2 to about 1.1:2 and said polychloroisocyanuric acid is dichloroisocyanuric acid.

11. The process of claim 9 wherein the molar ratio of said alkali metal hypochlorite to said monosodium cyanurate is in the range from about 1:1 to about 1.1:1 and said polychloroisocyanuric acid is trichloroisocyanuric acid.

12. The process of claim 1 wherein said process is a continuous process for preparing a polychloroisocyanuric acid which comprises:

a. reacting an aqueous slurry of a monoalkali metal cyanurate in a first reactor with an alkali metal hypochlorite and a chlorine-containing compound selected from the group consisting of chlorine and chlorine octahydrate to form a reaction slurry containing said polychloroisocyanuric acid, wherein the proportion of said chlorine-containing compound fed to said reaction slurry is in excess of the stoichiometric amount required with respect to said monoalkali metal cyanurate and said alkali metal hypochlorite combined, the proportion of chlorine-containing compound being equivalent to a molar ratio of said chlorine-containing compound to said monoalkali metal cyanurate and alkali metal hypochlorite combined of at least 1.01:1, b. maintaining the temperature in said reaction slurry in the range from about 10° to about 25°C. and the pH of said reaction slurry in the range from about 3 to 4.5, c. using said excess of said chlorine-containing compound to remove gaseous by-products formed during said reaction, d. reacting said excess containing gaseous by-products in a second reactor with an alkali metal compound selected from the group consisting of hydroxides and carbonates to produce a hypochlorite of said alkali metal, and e. recycling said alkali metal hypochlorite to said first reactor.

13. The process of claim 12 wherein the molar ratio of said chlorine-containing compound to said monoalkali metal cyanurate and said alkali metal hypochlorite combined is in the range from about 1.01:1 to about 5:1.

14. The process of claim 13 wherein the molar ratio of said alkali metal hypochlorite to said monoalkali metal cyanurate is in the range from about 1:2 to about 1.1:1.

15. The process of claim 14 wherein said monoalkali metal cyanurate is monosodium cyanurate.

16. The process of claim 15 wherein said chlorine-containing compound is chlorine.

17. The process of claim 16 wherein said alkali metal hypochlorite is sodium hypochlorite.

18. The process of claim 17 wherein the molar ratio of said chlorine to said monosodium cyanurate and said sodium hypochlorite combined is in the range from about 1.1:1 to about 4:1.

19. The process of claim 18 wherein the molar ratio of said sodium hypochlorite to said monosodium cyanurate is in the range from about 1:2 to about 1.1:2 and said polychloroisocyanuric acid is dichloroisocyanuric acid.

20. The process of claim 18 wherein the molar ratio of said sodium hypochlorite to said monosodium cyanurate is in the range from about 1:1 to about 1.1:1 and said polychloroisocyanuric acid is trichloroisocyanuric acid.

* * * * *